United States Patent
Falco (10) Patent No.: US 6,606,112 B1
(45) Date of Patent: Aug. 12, 2003

(54) COMPOSITE-VIDEO GENERATION FROM DIFFERENT-RATE CONSTITUENTS

(75) Inventor: Michael A. Falco, Swampscott, MA (US)

(73) Assignee: Tandberg Telecom AS (NO)

(*) Notice: Subject to any disclaimer, the term of this patent is extended or adjusted under 35 U.S.C. 154(b) by 0 days.

(21) Appl. No.: 09/526,894

(22) Filed: Mar. 16, 2000

(51) Int. Cl.$^7$ .................................................. H04N 7/14
(52) U.S. Cl. .................................. 348/14.12; 348/14.09
(58) Field of Search .............................. 348/14.1, 14.07, 348/14.09, 14.12, 385.1, 584, 387.1, 388.1

(56) References Cited

U.S. PATENT DOCUMENTS

| | | | | |
|---|---|---|---|---|
| 5,365,577 A | * | 11/1994 | Davis et al. .................. 379/96 |
| 5,453,780 A | * | 9/1995 | Chen et al. ................... 348/15 |
| 5,617,135 A | * | 4/1997 | Noda et al. ................... 348/12 |
| 5,936,662 A | * | 8/1999 | Kim et al. ..................... 348/15 |
| 5,990,933 A | * | 11/1999 | Ozone et al. .................. 348/15 |
| 5,995,490 A | * | 11/1999 | Shaffer et al. ............... 370/260 |
| 6,288,740 B1 | * | 9/2001 | Lai et al. ...................... 348/15 |

* cited by examiner

Primary Examiner—Victor R. Kostak
(74) Attorney, Agent, or Firm—Cesari and McKenna, LLP (57) ABSTRACT

Continuous presence designed in accordance with H.261 recommendation allows for several sites to be seen simultaneously on one screen. For instance, the H.261 recommendation specifies that two picture scanning formats (i.e., CIF and QCIF) may be used in a codec. Notably, H.323 end-points could send pictures in QCIF while receiving CIF pictures. An MCU could select four appropriate sites, receive QCIF pictures from those sites, form a composite picture, and distribute the composite picture to the conferencing end-points. It is desired to be able to allow the sites to transmit pictures at different rates according to their preferences. Each site is associated with a queue into which the transmitted QCIF pictures are stored. The transmission rate for those sites are then deduced. A thread then activates to determine if there are QCIF pictures to be placed in the associated queues. Another thread retrieves the QCIF pictures from the queues based on the deduced transmission rate. The retrieved QCIF pictures are then composed into a composite picture which is transmitted such that the composed QCIF is pictures are transmitted at their received transmission rates.

4 Claims, 8 Drawing Sheets

| ETHERNET HEADER | IP HEADER | UDP HEADER | RTP HEADER | H.261 HEADER | H.261 VIDEO STREAM | ETHERNET TRAILER |

FIG. 3

| V | P | X | CC | M | PT | SEQUENCE NUMBER |
| TIMESTAMP |
| SYNCHRONIZATION-SOURCE IDENTIFIER |
| CONTRIBUTING-SOURCE IDENTIFIERS |

FIG. 4

| PSC | TR | PTYPE | |

FIG. 5

| GBSC | GN | GQUANT | |

FIG. 8

| MBA | MTYPE | MQUANT | CBP |

FIG. 10

| SBIT | EBIT | I | V | GOBN | MBAP | QUANT | HMVD | VMVD |

COMPOSITE-VIDEO GENERATION FROM DIFFERENT-RATE CONSTITUENTS

BACKGROUND OF THE INVENTION

1. Field of the Invention

This invention relates to video teleconferencing, and in particular, to generating a composite video from video sources having different picture rates.

2. Background Information

Figure 1:
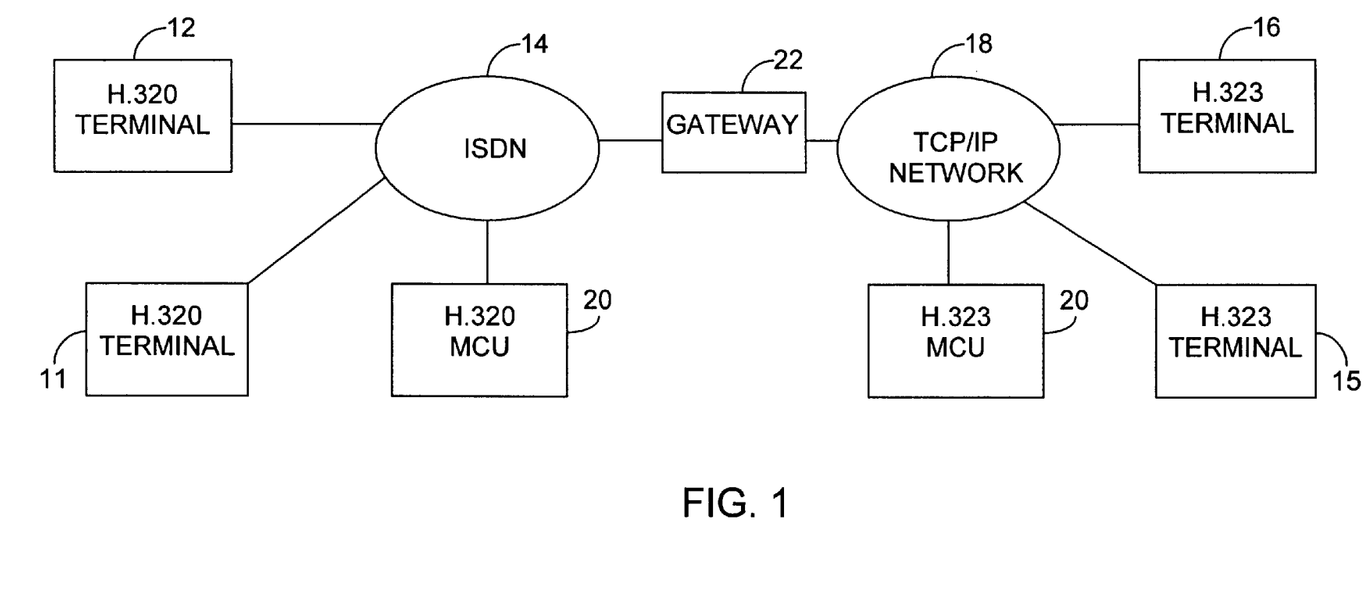
FIG. 1 is a block diagram of a communications topology illustrating an example of a typical environment in which the present invention can be employed.

A video teleconference, as its name implies, is a conference in which several audio-visual terminals located remotely from each other participate. In one instance, the videoconferencing system allows for the simultaneous exchange of video, audio, and other data between terminals. As FIG. 1 shows, an example of such a system is a plurality of interconnected terminals 11, 12, 15, and 16. For the sake of example, the drawing shows the transmission medium as including an Integrated Services Digital Network (ISDN), and a Transport Control Protocol/Internet Protocol (TCP/IP) network. In other words, videoconferencing can be performed by way of packet-switched networks as well as circuit-switched networks. A gateway 22 translates between protocols in the example.

A multipoint control unit (MCU) 20 receives signals from the various terminals, processes these signals into a form suitable for video teleconferencing, and retransmits the processed signals to the appropriate terminals. For example, the video signals from the various terminals may be spatially mixed to form a composite video signal that, when it is decoded, may display the various teleconference participants in one terminal. Usually, each terminal has a codec to encode video, audio and/or data signals to send to the MCU for appropriate distribution and to decode such signals from the MCU. Codes for this purpose are well known in the art and are exemplified, for instance, in the International Telecommunication Union (ITU) Telecommunication Standardization Sector recommendation document H.261 (ITU-T Recommendation H.261).

The Telecommunication Standardization Sector of the International Telecommunication Union (ITU-T) is responsible for standardizing the technical aspects of telecommunication on a worldwide basis. Its H-series recommendations concern video teleconferencing H-series. Among other H-series recommendations, H.221 defines frame structure, H.261 defines video coding and decoding, H.231 defines multipoint control units (MCUs), H.320 defines audio-visual terminals, and H.323 defines audio-visual terminals that do not provide a guaranteed quality of service. How the various devices in the video teleconferencing system interact with each other using the various recommendations are now briefly described.

The H.320 terminals employed in the system transmit H.221 frames of multiplexed audio-video and data information. (These frames should not be confused with video frames, which we will hereafter refer to as "pictures" to distinguish them from transmission frames.) Each frame consists of one or more channels, each of which comprises 80 octets of bits, and each of the 8 octet bit positions can be thought of as a separate sub-channel within the frame. In general, certain bits of a given octet will contain video information, certain bits will contain audio information, and certain bits may contain data, as FIG. 2's first row illustrates. Additionally, the eighth bit in certain of a frame's octets (not shown in the drawings) represents control information by which, among other things, frame boundaries can be recognized. The precise bit allocation is determined through a session negotiation process among the involved video teleconferencing terminals.

The H.323 terminals employed in the system use the real-time transmission protocol (RTP), known to one skilled in the art, and set forth in the Request For Comments (RFC) 1889. RFCs are published by the Internet Engineering Task Force (IETF), a community dedicated to standardizing various aspects of the Internet. An H.323 terminal uses separate RTP sessions to communicate the conference&s video and audio portions. Thus, as FIG. 2's first through third rows show, a gateway's option of translating from H.221 to RTP involves demultiplexing the H.221 data stream into its video, audio, and data constituents so that the gateway can packetize the video, audio, and data separately. In particular, video bits are extracted from a session of octets and concentrated into a stream that contains only the H.221 transmission's video parts. The stream is encoded in accordance with H.261 recommendation at the terminal using a codec. Note that the encoding may be in accordance with a related H.263 recommendation. However, the H.261 recommendation will generally be focused on here.

Figure 3:
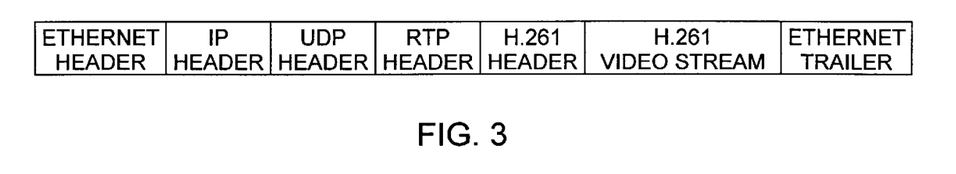
FIG. 3 is a diagram illustrating the format of a typical link-level packet used to transmit the video stream.

FIG. 3 illustrates a typical link layer packet suitable for transmission in accordance with the RTP protocol. If Ethernet is used for the link layer, information is sent to an Ethernet frame that begins and ends with an Ethernet header and trailer, which are used for sending the information to the next stop on the same local network. The frame's contents are in IP datagram, which also includes its own header, specified in RFC 791, for directing the datagram to its ultimate internetwork address. In video conference situations, RTP permits TCP to be used as the transport protocol (i.e., as the protocol for is directing the information to the desired application at the destination internet address). However, the User Datagram Protocol (UDP) is preferable to TCP for videoconferencing because TCP's re-transmission of lost video streams is unnecessary under these situations. Thus, FIG. 3 depicts the IP payload as a UDP datagram and includes a UDP header as specified in RFC 768.

Because packet-switched protocol data units do not in general arrive in order, and because real-time information must be presented in a predetermined time sequence, the UDP payload must include information specifying the sequence in which the information was sent and its real-time relationship to other packets. So the payload begins with an RTP header, specified in RFC 1889, that gives this and other information.

Figure 4:
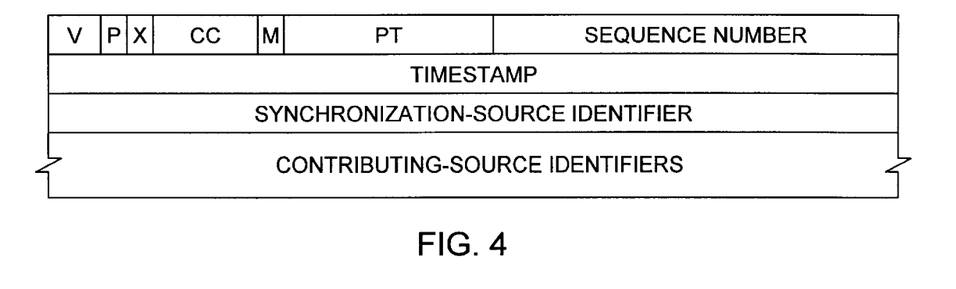
FIG. 4 is a diagram illustrating the RTP header of FIG. 3.

The RTP header format, depicted in FIG. 4, is shown as successive four-byte rows. RFC 1889 describes the various FIG. 4 fields' purposes in detail, so only the timestamp field is mentioned here. When information travels by way of a packet-switched network, different constituent packets make their ways to their common destination independently. That is, different packets can take different routes, so the times required for different packets to arrive at their respective destinations are not in general the same, and packets can arrive out of sequence or in time relationships that otherwise differ from those with which their contained information was generated. RTP therefore provides for a time-stamp in each packet to indicate the real-time relationships with which the information is to be played. Typically, gateways and H.323 devices (e.g., terminals and MCUs) use a local clock to provide the RTP-required timestamp as they assemble H.261 packets.

However, it would be complicated to play the resultant timestamp information if no notice were taken of the actual contents of the data stream being packetized. For example, a single packet could contain parts of two different video pictures, so parts of the same picture would have the same timestamp, while different parts would have different timestamps. To avoid this, the packets need to be monitored for picture boundaries.

Figure 2:
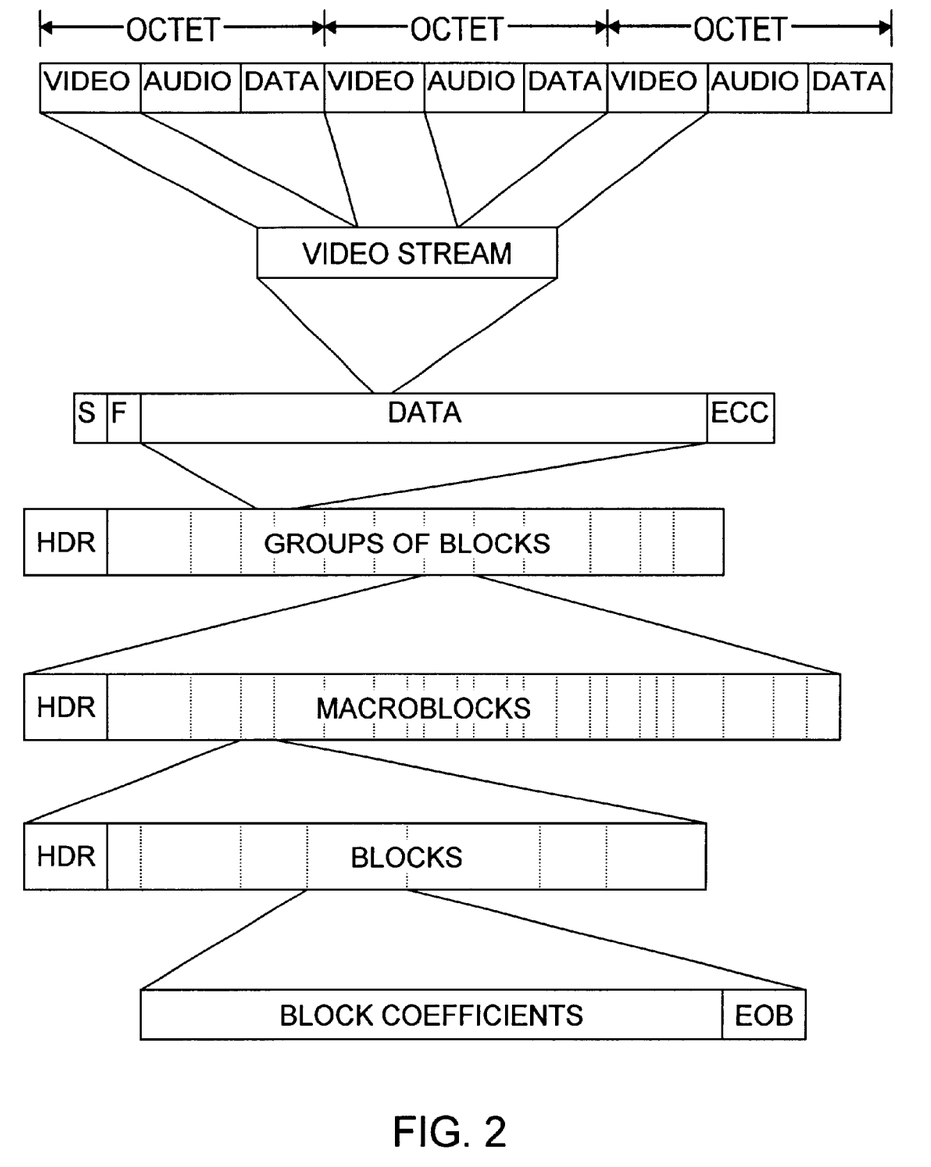
FIG. 2 is a diagram that illustrates the format of a video stream as initially sent by an H.320 end-point and is then converted to an H.261 format.
Figure 5:
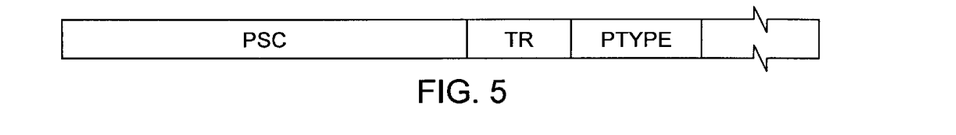
FIG. 5 is a diagram illustrating the header of a single-picture portion of the video stream.

FIG. 2's fourth through seventh rows depict the structure that the incoming data stream uses to represent successive video pictures in accordance with H.261. The fourth row illustrates a data-stream portion covering a single video picture. It shows that the portion begins with a header, and FIG. 5 illustrates that header's structure.

The header field of importance here is the Picture Start Code (PSC). For H.261 streams, that field value is always $00010_H$, a sequence that cannot occur elsewhere in the data stream. If a length of a single-picture portion of the data stream exceeds the underlying protocol's maximum-transmission-unit size, the H.323 device breaks the single picture's data into multiple packets. For such packets, the timestamp entered is the same as that assigned to the last PSC-containing packet. In those instances, RFCs such as RFC 2032 entitled "RTP Payload Format for H.261 Video Streams" and RFC 2190 titled "RTP Payload Format for H.263 Video Streams," both of whose contents are well known to those skilled in this art, specify how the picture's data should be packetized. Packetization can be appreciated by first reviewing the picture data's finer structure.

Figures 6, 7, 9:
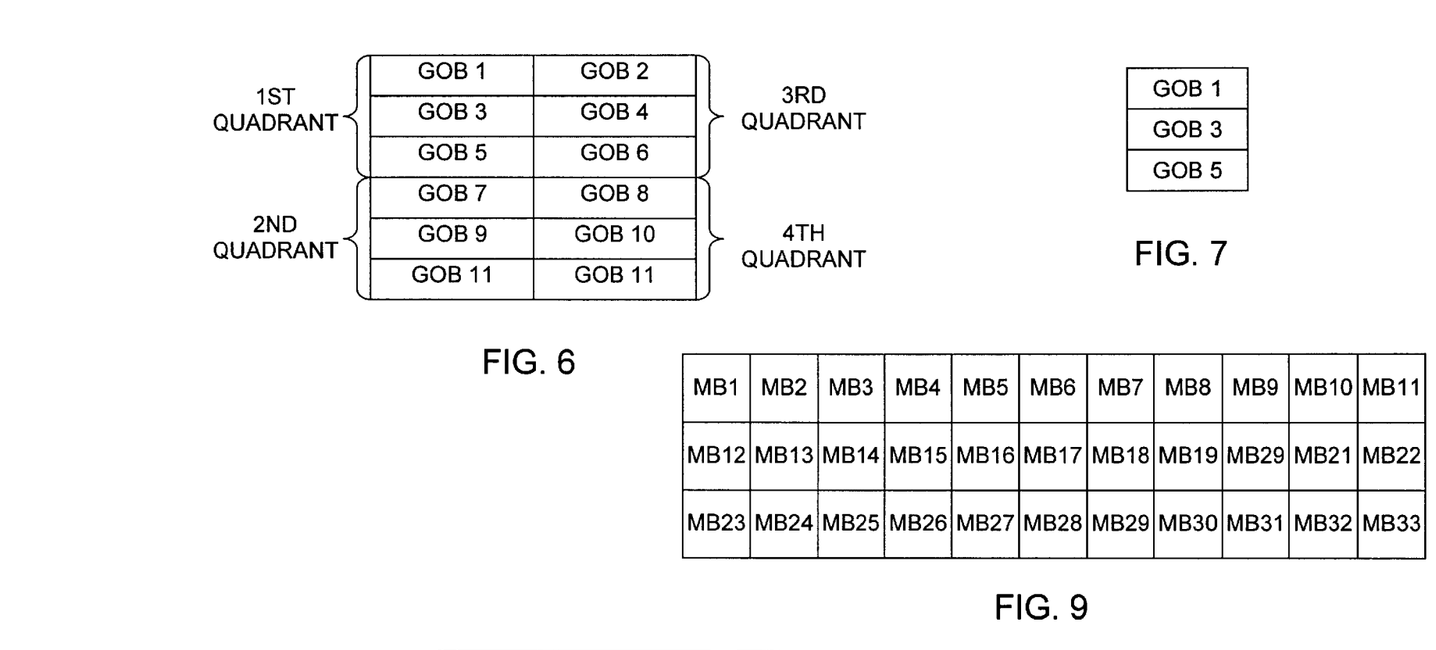
FIG. 6 is a diagram of a single picture's division into groups of blocks ("GOBs") in common intermediate format (CIF)
FIG. 7 is a diagram of a single picture's division into groups of blocks ("GOBs") in quarter common intermediate format (QCIF)
FIG. 9 is a diagram illustrating a single-GOB picture segment's division into subregions represented by respective "macroblocks"

As FIG. 2's fourth row indicates, the picture data's body portion is divided into "groups of blocks" (GOBs). H.261 specifies a Common Intermediate Format (CIF) in which each GOB represents one-twelfth of the resultant picture area, in a spatial relation-ship that FIG. 6 illustrates. H.261 also specifies an alternative, more-sparsely sampled quarter-CIF (QCIF) format. When QCIF is employed, each GOB represents one-third of the total picture area, as FIG. 7 illustrates.

FIG. 2's fourth row depicts the GOB fields as being unequal in length. This is because the degree of H.261-specified data compression depends on the source picture's data redundancy, which can differ from region to region.

Figure 8:
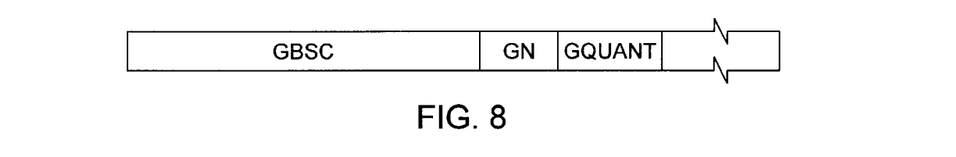
FIG. 8 is a diagram illustrating the header of a GOB portion of the video stream.

FIG. 2's fifth row shows that each GOB field has its own header, and FIG. 8 illustrates a GOB header's structure. The GOB header begins with a Group-of-Blocks Start Code (GBSC). That code's value is $0001_H$, a sequence that cannot occur elsewhere (except in the PSC).

The GOB's Group Number (GN in FIG. 8) follows the GBSC code and specifies the GOB region's position in accordance with the scheme shown in FIG. 6 or FIG. 7. Next is a default quantization value GQUANT, which influences the contained data's interpretation by specifying the magnitude intervals at which the values were quantized. The header may additionally contain further, optional fields. FIG. 2's fifth row shows that a GOB is divided into so-called macroblocks, which correspond to subregions within the GOB regions. FIG. 9 illustrates a single-GOB picture segment's division into subregions represented by respective macroblocks. Although there are thirty-three such subregions in a GOB-represented region, FIG. 2 depicts somewhat fewer macroblocks than that, because macroblocks that are redundant in view of previous macroblocks can be omitted in accordance with H.261. (As those familiar with the H.261 specification will recognize, previous may have either a temporal or a spatial meaning; that specification admits of a variety of data-compression techniques.)

Figure 10:
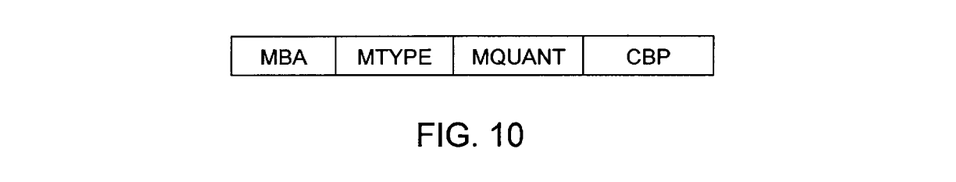
FIG. 10 is a diagram illustrating a macroblock header.

FIG. 2's sixth row shows that each macroblock has its own header, and FIG. 10 illustrates that header's structure.

The header's MacroBlock Address (MBA) field contains a variable-length code for the difference between the current macroblock's address and that of the previously sent GOB's block (since not all macroblocks are sent for every GOB). The MTYPE field specifies the manner in which the current macroblock's data were encoded; the data may be the result of comparing the raw data with a neighbor macroblock's data, with the corresponding data from a previous picture, with filtered versions of either of them, etc. If an MQUANT field is present, its contents supersede the default quantization that the GQUANT field in the enclosing GOB's header specifies.

Figure 11:
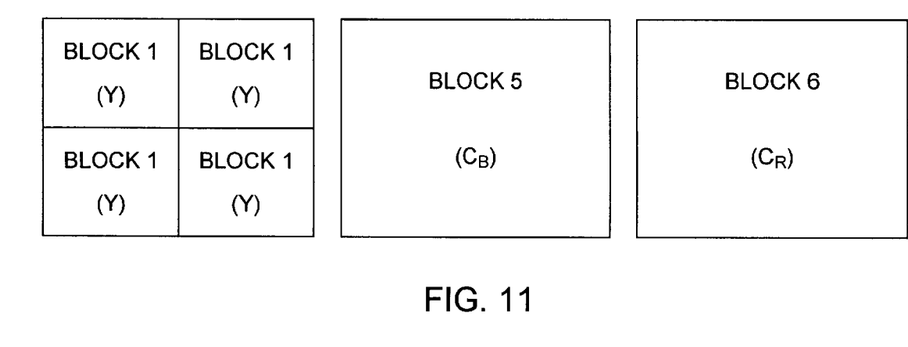
FIG. 11 is a diagram illustrating a macroblock region's coverage by its constituent blocks.

The CBP field specifies the macroblock's constituent "blocks" for which the macroblock field contains data. There are at most six such blocks. The first four represent the luminance (Y) information from respective segments of a macroblock subregion divided as FIG. 11's left rectangle illustrates. The fifth and sixth block fields represent more-sparsely sampled blue ($C_B$) and red ($C_R$) color-difference values covering the whole macroblock region, as FIG. 11's center and right rectangles indicate. Each block field's contents are coefficients of an 8×8 discrete cosine transform of the data that remain after any subtraction by previous-image data.

Continuous Presence designed in accordance with the H.261 recommendation allows for several sites to be seen simultaneously on one screen. In one example, it takes advantage of the following characteristics of the H.261 data stream and the H.323 endpoints. The H.261 recommendation specifies that two picture scanning formats (i.e., CIF is and QCIF) may be used by the codec. Notably, the H.323 end-points could send pictures in QCIF while receiving CIF pictures. Thus, a multipoint control unit (MCU) could select the four most appropriate sites, receive the QCIF pictures from those sites, form a composite picture from them, and distribute the composite picture to the conferencing endpoints. In this manner, four conferencing sites may be viewed on the screen.

However, the sites transmitting the QCIF pictures are usually not within the control of the MCU. Stated differently, the terminals at the sites operate independently and transmit pictures at different rates according to their preferences. Also, the burstiness of the video packets, perhaps due to network jitter, may cause multiple pictures to arrive at the MCU at a time from the sites.

SUMMARY OF THE INVENTION

In accordance with the invention, the MCU has the ability to handle different picture rates from end-points. As the QCIF pictures are completed for the sites to be viewed, they are queued in their respective queues in the memory of the MCU. Each queue represents a quadrant of the CIF picture. The queues have respective put pointers and get pointers that indicate where in the queue a QCIF picture is to be placed and retrieved respectively. Because one or more queues may receive pictures at different rates, the MCU employs a thread of execution, called a "put thread" to accommodate these different rates. Each time the put thread "wakes up", it determines whether any complete QCIF pictures have been assembled since the last thread activation and if any, the put thread stores the picture at the respective queue in the position pointed by the respective put pointer and then updates the pointer. Another thread, the get thread, controls retrieval from the queues, and it is typically activated at a different rate. For instance, if the composite picture is transmitted at 30 pictures/sec., the get thread wakes up at 30 pictures/sec. to determine if there are pictures in the queue to be formed into a composite picture. The put thread retrieves the pictures from their queues at intervals that correspond to their transmission rate.

For the MCU to be able to handle these different rates, it monitors the incoming packets of each quadrant for temporal information. From the information, the MCU knows the picture rates for each quadrant and programs the get thread to retrieve pictures from their respective queues according to their transmission rates.

BRIEF DESCRIPTION OF THE DRAWINGS

The invention description below refers to the accompanying drawings, of which.

DETAILED DESCRIPTION OF AN ILLUSTRATIVE EMBODIMENT

Terminals 11 and 12 in FIG. 1 employ the public switched telephone network for videoconferencing and comply with the H.320 recommendation of the International Telecommunications Union's Telecommunication Standardization Sector (ITU-T). On the other hand, Terminals 15 and 16 employ packet-switched networks and comply with ITU-T's H.323 recommendation. A gateway 22 can be used to translate between the networks. To facilitate video teleconferencing among the various terminals, a multipoint control unit (MCU) 20 is implemented to receive the various signals from the terminals and transform them into signals suitable for conferencing.

Figure 12:
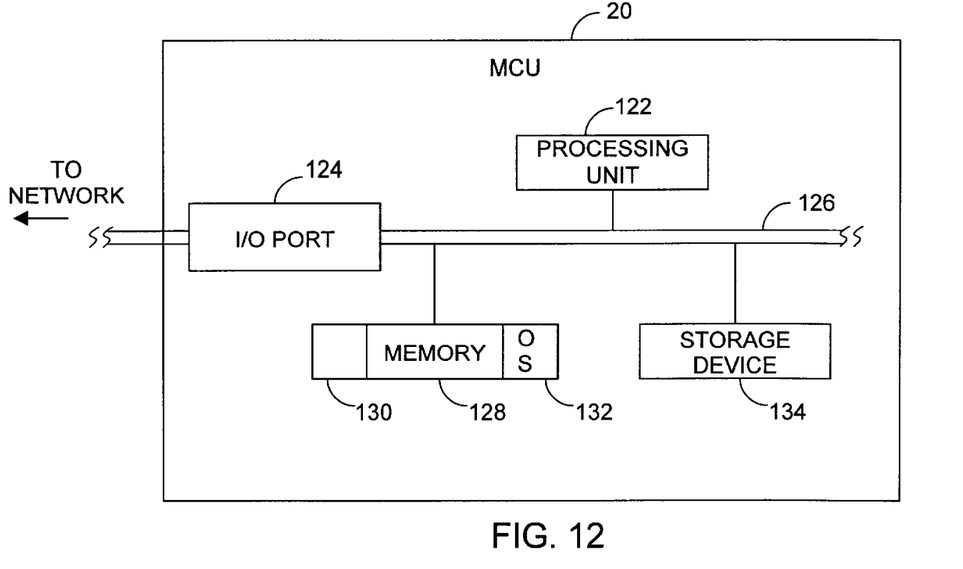
FIG. 12 is a diagram of a multipoint control unit ("MCU") of a type that can embody the present invention.

As shown in FIG. 12, the MCU 20 may be a commercially available computer capable of connecting to a network through an input/output (I/O) port 124. According to the illustrated embodiment, the I/O port 124 is an Ethernet card that transmits and receives packets in the format shown in FIG. 3. The MCU 20 further comprises a processing unit 122 and a main memory 128 coupled together through a bus 126. The processing unit 122 may be a microprocessor, a microcontroller, digital signal processors (DSPs), application specific integrated circuits (ASICs), or the like. Although the figure shows a single processing unit 122, one skilled in the art will understand that a multiprocessing unit may be used to make the MCU 20 perform faster.

Typical processing units will operate in accordance with software stored temporarily in the main memory 128 to control the various hardware of the MCU and facilitate multitasking as well as networking. Such software usually includes an operating system 132 and an MCU module 130. That module directs the processing unit 122 to perform various MCU operations as will be apparent from FIGS. 13–16.

Further coupled to the bus 126 are various resources such as a storage device 134 with a magnetic or an optical media that may be used persistent storage of the above-mentioned software. Again, it will be apparent to one skilled in the art that the MCU module 130 can instead be implemented in hardware such as an application specific integrated circuit (ASIC).

Figure 13:
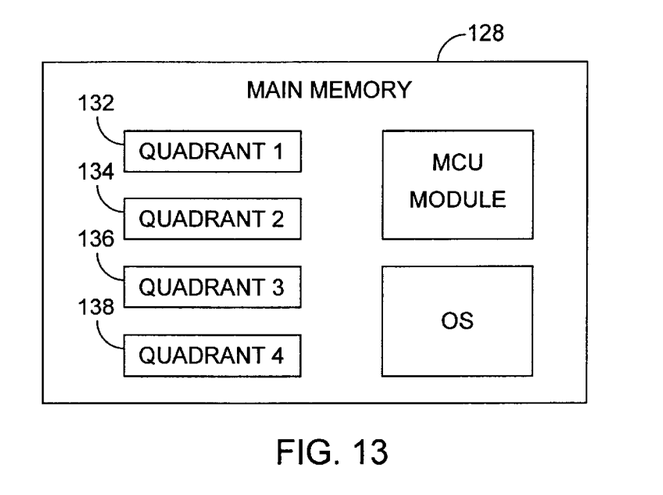
FIG. 13 is a more-detailed diagram of a main memory showing buffers for storing QCIF pictures for each site.
Figure 14:
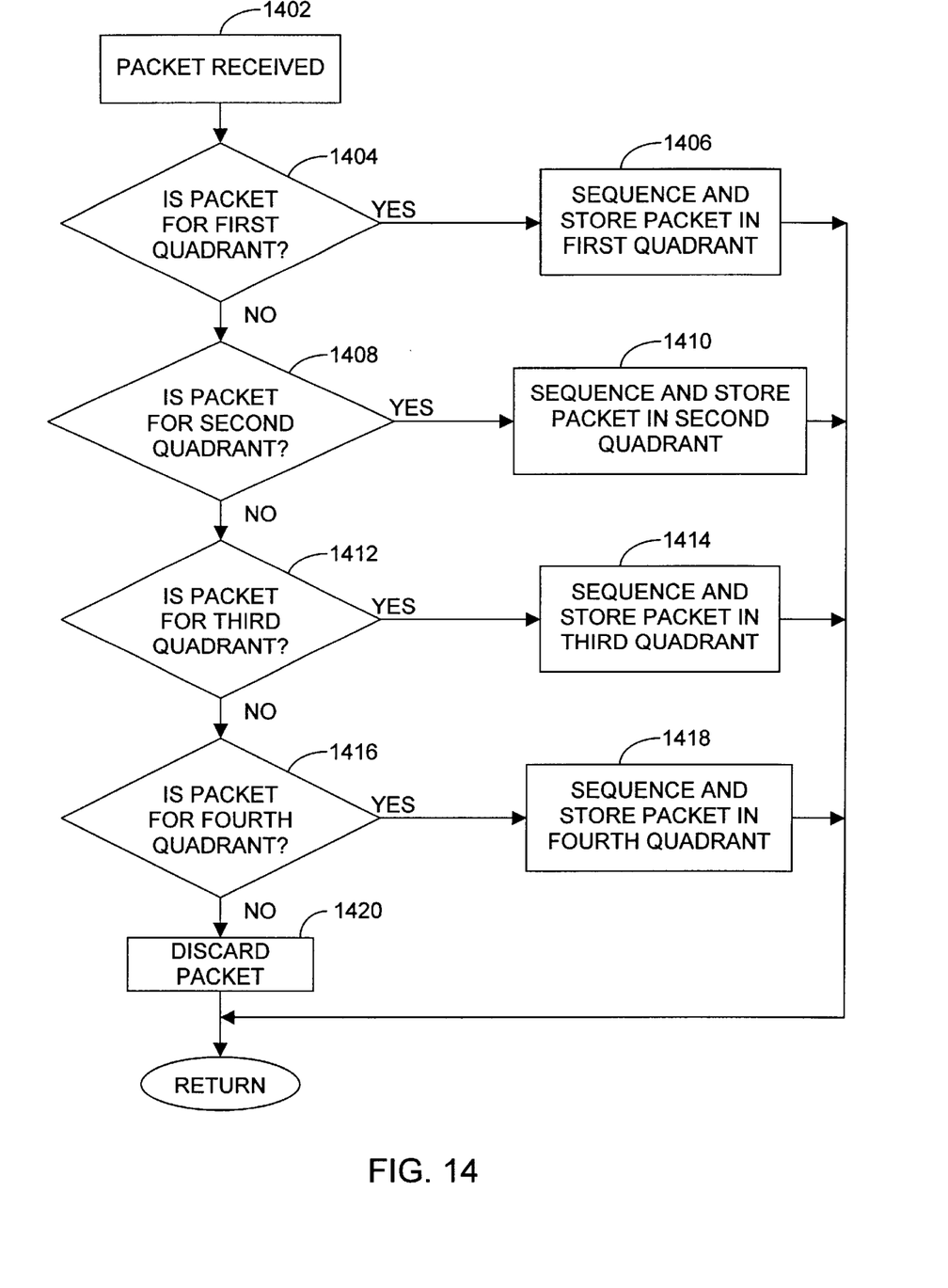
FIG. 14 is a flow chart of a routine for storing packets representing QCIF pictures into their respective quadrants in a CIF picture.

The MCU 20 receives various QCIF packets from the several sites via the I/O port 124 and decides which four conferencing sites should be viewed. (Note that the description will be given using a single conference session as an example.) In one example, the sites selected will be those of the loudest speaker and of the three most recent previous loudest speakers. The MCU 20 then maintains for each site a separate buffer in the memory 128 to accumulate the inbound packets as shown in FIG. 13. The buffers 132–138 should be big enough to accumulate and queue enough packets to represent at least one QCIF picture. Each stored site will represent a quadrant in the outbound four-quadrant CIF picture forming the continuous presence. The MCU does not decode the QCIF pictures into their video stream constituents. Instead, it stores them in their GOB format. Because each QCIF picture comprises three GOBs and a quadrant in the CIF picture also comprises three GOBs (with four quadrants representing total of twelve GOBs), forming the CIF picture is simply a matter of determining into which quadrant each GOB should be placed. FIG. 14 illustrates the process for doing so.

In block 1402, the MCU receives an inbound packet, and in blocks 1404, 1408, 1412 and 1416, it decides in which quadrant the packet should be stored. One method may be to look at the source address of the packet to determine the site it came from. The packet is then forwarded to the correct quadrant. In block 1406, as in blocks 1410, 1414, and 1418, the MCU first looks for a packet having a picture start code (PSC) that indicates the start of a new QCIF picture. Once such a packet is read, successive incoming packets, which belong to this picture, are sequenced using the sequence number in the packet's RTP header (see FIG. 4) and stored in a queue. If a gap in the sequence is formed during sequencing, the gap usually indicates a missing packet. But the MCU returns the accumulated packets for that gap-containing picture for a while before deciding that the packet has been lost. It then discards those packets. Once the packet has been properly sequenced and stored, the MCU returns for the next packet. It may be that the MCU receives a packet that does not belong to any of the quadrants, or it may detect that the packet is corrupt. As block 1420 indicates, the packet is dropped and the MCU returns to block 1402 to wait for the next incoming packet. This process is repeated until sufficient packets are collected in the queue to make up at least one complete QCIF picture.

Figure 15:
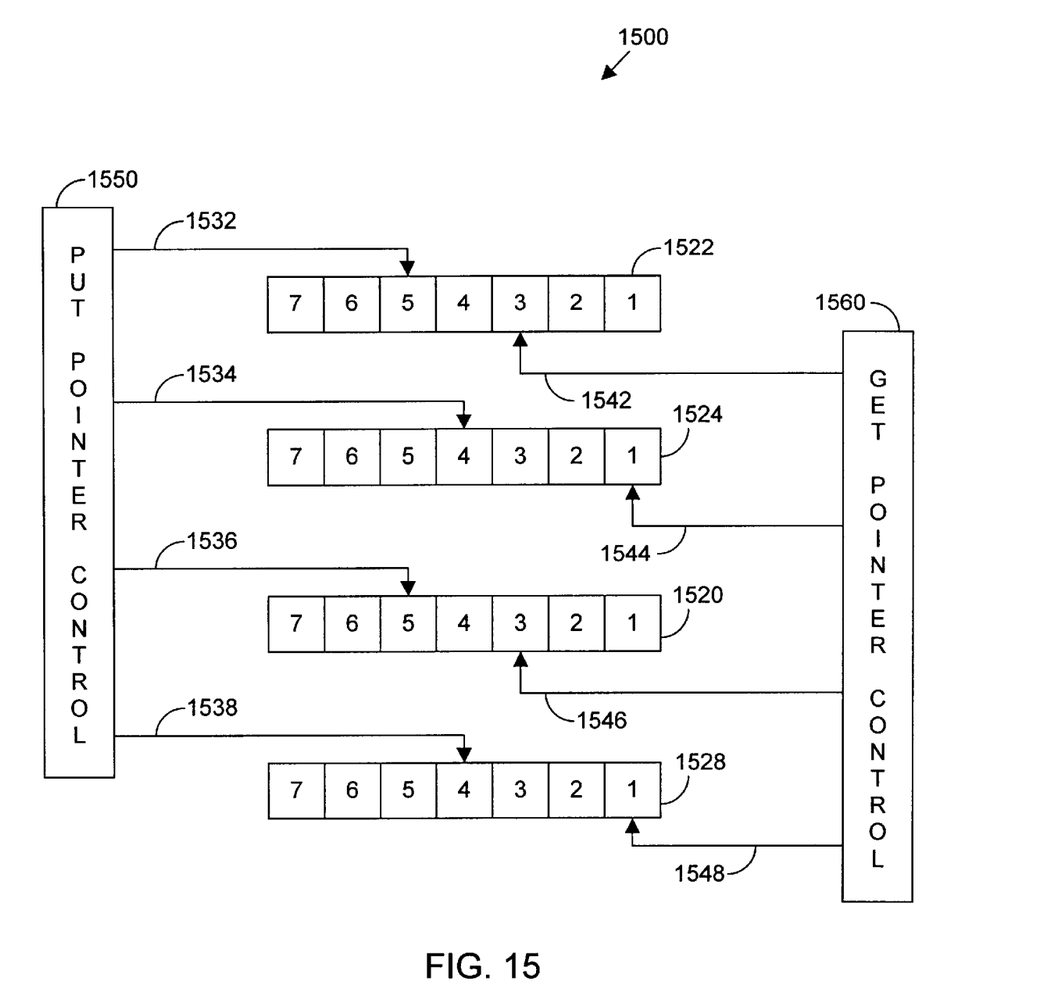
FIG. 15 is a diagram of a queue system that embodies the present invention.

FIG. 15 is a schematic diagram of a queue system 1500 designed in accordance with the invention. When QCIF pictures are completed, they are queued in their respective queues 1522, 1524, 1526, and 1528, each of whose stages 1–7 contains a single QCIF picture. The queues' outputs are together to be eventually composed into CIF pictures. Accordingly, each queue represents a quadrant. Queues 1522, 1524, 1526, and 1528 have respective put pointers 1532, 1534, 1536, and 1538 and get pointers 1542, 1544, 1546, and 1548. Each pointer independently starts from a least significant position of its respective queue and increments upwards until it reaches the most significant position. The pointers then reset back to the least significant position to repeat the process. Although the figure shows the indices to be pointers, they can be wrap-around counters that keep track of the QCIF pictures being received and sent.

Consider queue 1522 as an example. When a picture is received, it is stored at the position indicated by the put pointer 1532. The pointer is then incremented to point to the next picture position in the queue to be stored. Similarly, when it is time to retrieve a picture from the queue 1522, it is retrieved from the position indicated by the get pointer 1542 and then, the pointer is incremented.

Because one or more quadrants may receive pictures at different rates, the queues also fill up at different rates. In the illustrated system of FIG. 1, the H.323 terminals' transmission rates vary among 30 pictures/sec., 15 pictures/sec., 7.5 pictures/sec., and others. To accommodate these different rates, the illustrated MCU of FIG. 12 employs a thread of execution, called a "put thread," that is activated at, say, 100 times a second. Each time the put thread "wakes up," it determines whether any complete QCIF pictures have been assembled since the last thread activation. If any have, the put thread stores each at the position pointed to by the respective put pointer and then updates the pointer. Another thread (i.e., a "get thread") controls retrieval from the queues, and it is typically activated at a different rate. For instance, if the composite picture is to be transmitted at 30 pictures/second, the get thread wakes up 30 times a second to determine if there are pictures in the queues to be formed into a composite picture. If there are such pictures, the get thread retrieves those pictures from the positions indicated by the respective get pointers 1542, 1544, 1546, 1548 and then updates the pointers.

Assuming that the composite picture transmission rate is set at 30 pictures/sec, however, the individual pictures in each quadrant should be sent at their original rate within the composite picture. Otherwise, for instance, the pictures received at 15 pictures/sec and transmitted at 30 pictures/sec would look fast-forwarded at some intervals and normal at other intervals in its quadrant. Thus, for example, if the first and third quadrants display end-points sending at 30 pictures/sec and the second and fourth quadrants display end-points sending at 15 pictures/sec, the composite picture should accommodate their respective picture rates in their quadrants although the composite picture itself is being transmitted at 30 pictures/sec. Therefore, for the MCU to be able to handle these different rates, it monitors the incoming packets of each quadrant for temporal information.

As shown in FIG. 5, the picture header includes a temporal reference (TR) that gives an indication of the picture rate at which the end-point is sending. As specified in the H.261 recommendation) the TR field is a 5-bit number having 32 possible values. It increments its value from the previously sent picture header by one plus the number of non-transmitted pictures since last transmitted. For instance, if the picture rate is 30 pictures/sec, then the TR field increments by one for every picture header sent. If the picture rate is 15 pictures/sec, the TR field increments by two for every picture header sent. The MCU, by monitoring the difference in increment of thee TR field value for two or more successive picture headers will be able to deduce the picture rate of the end-point. After deducing this information for all four quadrants, the MCU is able to control the picture rate at which each quadrant is to be retrieved.

With the picture rates known for each quadrant, the MCU programs the get thread to retrieve picture; from their respective queues according to their transmission rates. Thus, using the example above, when the get thread controlling the get pointers wakes up, in the first interval, it may retrieve pictures from the first and third queues, which receives at 30 pictures/sec, and fills the first and third quadrants of the composite picture. As for the second and fourth quadrants, pictures in the second and fourth queues are ignored, and it transmits GOBs with zeros as data to indicate no change in those quadrants. In the next interval, the thread will retrieve pictures from all the queues representing all the quadrants. By retrieving pictures in the quadrant having 30 pictures/sec rate at every wake up interval and retrieving pictures in the quadrant having 15 pictures/sec rate at every alternate wake up interval, although the composite pictures are sent at 30 pictures/sec, the individual quadrants maintain their original send rate. Of course, for a quadrant having a picture rate of 7.5 pictures/sec, that picture is retrieved at every fourth wake up interval of the get thread.

There are instances where, due to the burstiness of the video packets that results, for instance, from network jitter, multiple pictures from an end-point may appear at the MCU and threaten to overflow its corresponding queue. The MCU therefore tracks an average packet count on each end-point based on its transmission rate. The MCU further keeps track of the number of counts between the get pointer and the put pointer of each queue such that the put pointer does not overrun the get pointer. Thus, if the MCU detects an unusually high transmission rate from an end-point or the number of counts exceeds the allowable tolerance, the MCU programs the get thread to transmit pictures from the respective queue regardless of its transmission send rate to prevent buffer overflow. For example, if the pictures in the second buffer are retrieved every alternate get thread wake up interval, the get thread now retrieves and causes it to be composed at every wake up interval until the MCU reverts it back to its normal mode. In other words, a picture in the quadrant being sent at 15 pictures/sec are now sent at 30 pictures/sec. If that measure is insufficient, the MCU may resort to increasing the send rate of the composite picture, say, from 30 pictures/sec to 60 pictures/sec and program the get thread appropriately to retrieve the pictures from the queues until the overflow is diverted. Although, so far, the invention has been described in terms of a software implemented execution thread, one skilled in the art would recognize that threads may be implemented in hardware such as application specific integrated circuits (ASICs), which FIG. 15 represents as a put pointer controller 1550 and get pointer controller 1560.

Figure 16:
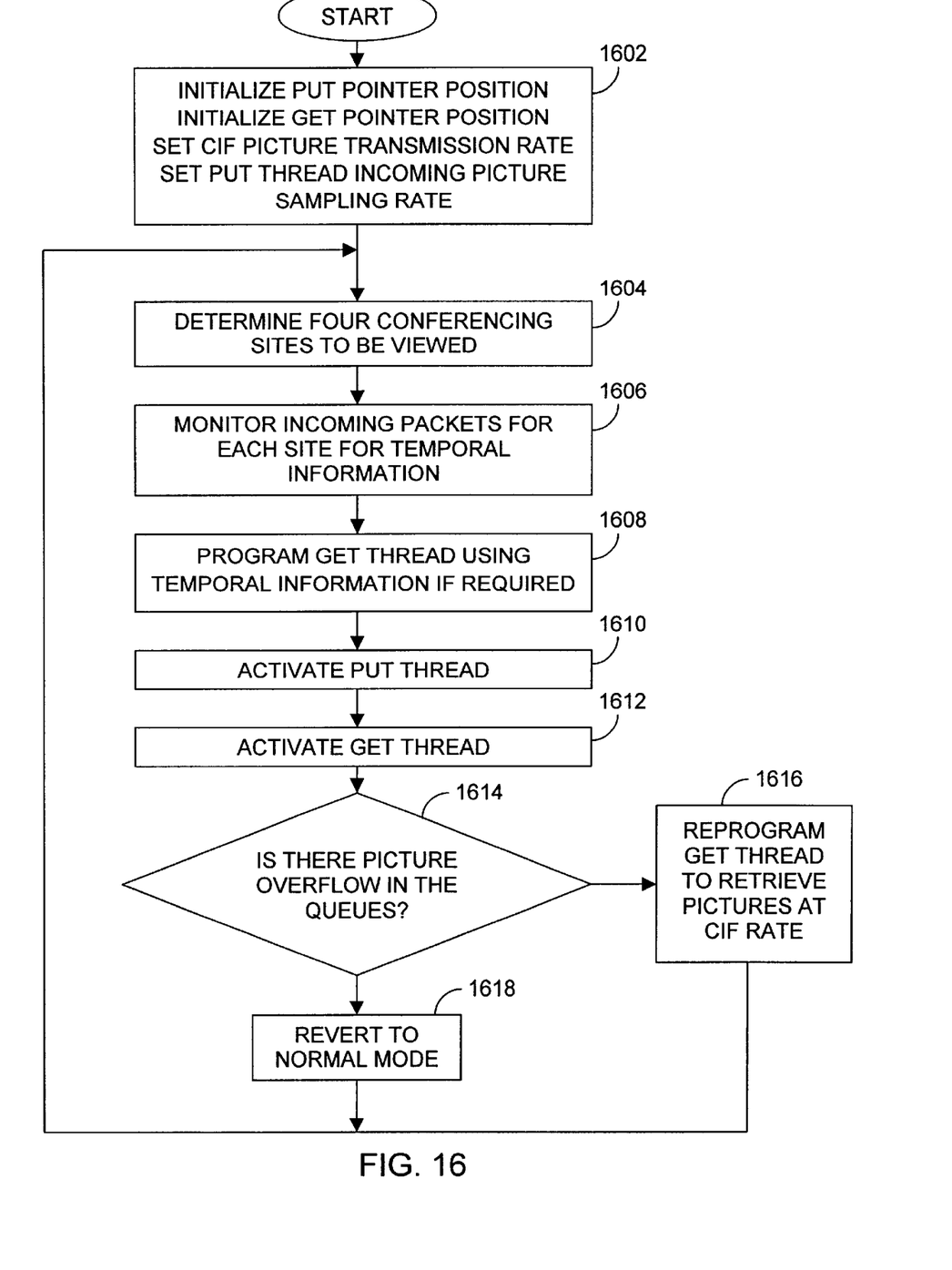
FIG. 16 is a flow chart of a routine that shows the operation of the queue system.
Figure 17:
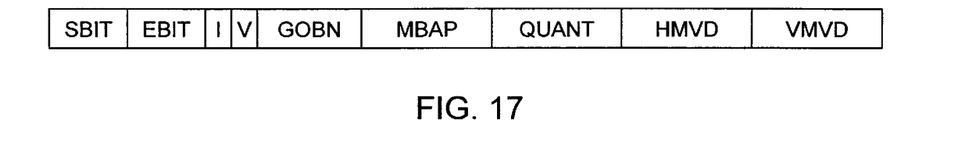
FIG. 17 is a diagram of FIG. 3's H.261 header.

FIG. 16 summarizes the above process. In block 1602, the MCU initializes the positions of the put pointers and the get pointers in the picture queues. The MCU also sets the CIF picture transmission rate and programs the put thread's rate of activation. In block 1604, the MCU determines which four conferencing sites should be viewed in a representative quadrant of the CIF picture. In block 1606, the MCU monitors the incoming packets from each site for temporal information. From the temporal information, the MCU deduces each site's QCIF picture send rate. In block 1608, the MCU programs the get thread such that a picture in a queue will be retrieved at its send rate. Stated differently, each quadrant is transmitted at its send rate although the CIF picture is transmitted at its predetermined rate. In block 1610, put-thread activation begins at the programmed rate. At each activation, the put thread wakes up and determines whether there is a complete QCIF picture ready to be stored in a respective queue. If so, it stores the picture and updates the put pointer. The wake up interval is timed by a counter which is initialized in block 1602. In block 1612, get-thread activation begins at its programmed rate. At each activation, the get thread wakes up to retrieve QCIF pictures that need to be composed into a CIF picture and sent. The rates at which it retrieves pictures from different queues is determined by the temporal information received from the MCU. If a given queue's rate does not result in a retrieval of a QCIF picture for a given CIF-picture transmission, the associated quadrant information consists of GOBs having zero values to indicate that there is no change in the picture for that quadrant. In block 1614, the MCU monitors the queues for picture overflow. If the receiving rate is so high that the put pointer may overrun the get pointer, in block 1616, the MCU re-programs the get thread to retrieve pictures at the CIF send rate until the queue's occupancy is reduced to an acceptable level. If that reduction does not result, then the MCU re-programs to send CIF pictures at a higher rate and further programs the get thread to retrieve the QCIF pictures from the queues at this higher CIF rate. This queue overflow prevention routine is performed until the pictures in the problem queues are down to an acceptable level in which, in block 1618, the Get thread (and the CIF send rate, if applicable) is reverted back to its normal mode. This process is repeated throughout the duration of the conference session.

What is claimed is:

1. A method of performing multipoint-conference transmission comprising:
    A) receiving from a plurality of source end points source pictures that represent respective source images and include temporal information indicative of source picture rates respectively associated therewith, the source picture rate thereby associated with at least a first one of the source end points being lower than the source picture rate thereby associated with at least another one of the source end points; and
    B) transmitting, at a transmission rate equal to a multiple of the source picture rate associated with the first source end point, composite pictures representing a composite image divided into image segments that:
        1) are associated with different ones of the source end points; and
        2) contain the constituent images respectively represented by the source pictures from the source end points with which those image segments are associated, the composite pictures that contain pictures from the first source end point being so interposed with composite pictures containing no picture from the first source end point that the resultant stream of composite pictures updates the image segment associated with the first source end point at only the source picture rate associated therewith.

2. A method as defined in claim 1 wherein:
    A) each source picture includes a picture header that contains a temporal-reference field whose value differs from that of the temporal-reference field of the source picture last sent by the same source end point by one plus the number of intervening picture times; and
    B) the method includes determining the source picture rate of each source end point from the values of the temporal-reference fields of successive source pictures sent thereby.

3. A multipoint processing unit comprising:
    A) circuitry for receiving communications packets that together contain source pictures, sent by a plurality of respective source end points, that include temporal information indicative of source picture rates respectively associated with the source end points from which the source pictures were sent, the source picture rate thereby associated with at least a first one of the source end points being lower than the source picture rate thereby associated with at least another one of the source end points; and
    B) composite-picture-generation circuitry for generating, at a rate equal to a multiple of the source picture rate associated with the first source end point, composite pictures representing a composite image divided into image segments that:
        i) are associated with different ones of the source end points; and
        ii) contain the constituent images respectively represented by the source pictures from the source end points with which those image segments are associated; and
    C) transmission circuitry for transmitting the composite pictures by so interposing composite pictures that contain no picture from the first source end point with composite pictures containing pictures from the first source end point that the resultant stream of composite pictures updates the image segment associated with the first source source end point at only the source picture rate associated therewith.

4. A multipoint processing unit as defined in claim 3 wherein:
    A) each source picture includes a picture header that contains a temporal-reference field whose value differs from that of the temporal-reference field of the source picture last sent by the same source end point by one plus the number of intervening picture times; and
    B) composite-picture-generation circuitry determines the source picture rate of each source end point from the values of the temporal-reference fields of successive source pictures sent thereby.

* * * * *